United States Patent [19]
Furuhata et al.

[11] Patent Number: 5,805,557
[45] Date of Patent: Sep. 8, 1998

[54] OPTICAL PICKUP

[75] Inventors: Hitoshi Furuhata; Aki Terajima; Shigeru Takaya; Masufumi Asada, all of Saitama-ken, Japan

[73] Assignee: Pioneer Electronic Corporation, Tokyo, Japan

[21] Appl. No.: 927,198

[22] Filed: Sep. 11, 1997

[30] Foreign Application Priority Data

Sep. 13, 1996 [JP] Japan .................................. 8-243077

[51] Int. Cl.$^6$ ........................................................ G11B 7/00
[52] U.S. Cl. ...................... 369/109; 369/44.23; 369/103; 369/112
[58] Field of Search ..................... 369/109, 103, 369/112, 44.23

[56] References Cited

U.S. PATENT DOCUMENTS 5,627,812  5/1997  Yamamoto et al. ................. 369/103
5,652,744  7/1997  Freeman et al. .................... 369/109

*Primary Examiner*—Tod R. Swann
*Assistant Examiner*—Kim-Kwok Chu
*Attorney, Agent, or Firm*—Morgan, Lewis & Bockius LLP

[57] ABSTRACT

There is provided an optical pickup which comprises a light source, an objective lens for converging a beam from the light source onto an optical disc, a diffraction grating for passing a beam returning from the optical disc, a photo-detector for receiving returning beams passing through the diffraction grating. The diffraction grating is divided into two areas, each area including alternatively arranged first diffraction grating pattern and second diffraction grating pattern.

8 Claims, 16 Drawing Sheets

PATTERN a PATTERN b PATTERN a PATTERN b

P : THE CENTER OF DIFFRACTION GRATING

P : THE CENTER OF DIFFRACTION GRATING

P : THE CENTER OF DIFFRACTION GRATING $FE = (E_1 + E_2 + G) - (H_1 + H_2 + F) = 0$

FOCUS ERROR SIGNAL

FAR

NEAR $FE = (E_1 + E_2 + G) - (H_1 + H_2 + F) = 0$

TRACK DIRECTION

FE=(E+G)−(H+F)=0

PRIOR ART

OPTICAL PICKUP

BACKGROUND OF THE INVENTION

The present invention relates to an optical pickup, in particular to an optical pickup employing hologram.

In recent years, with the research and development of hologram laser unit capable of integrally receiving all the necessary optical elements except objective lens, there has been suggested a compact optical pickup employing hologram, such as that shown in FIG. 11.

In the optical pickup employing hologram as shown in FIG. 11, a laser beam being irradiated from a laser diode 1 is passed through a diffraction grating 3 provided on the lower side of a hologram optical unit 2, so as to be divided into three beams including ± first order beams and a zero order beam. The three beams are passed through a diffraction grating 4 provided on the upper side of the hologram optical unit 2, and are further passed through an objective lens 5 to be converged onto an optical disc 6.

Beams returning from the optical disc 6 are also passed through the objective lens 5 and the diffraction grating 4, so that ± first order beams are directed on to detecting surfaces 7a and 8a of photo-detectors 7 and 8, as shown in FIG. 12. In detail, the beam to be received on the photo-detector 7 will converge behind the photo-detector 7, whereas the beam to be received on the photo-detector 8 will converge before the photo-detector 8.

Here, a focus error signal FE may be detected in accordance with the following relationship reflecting the sizes of beams on the photo-detectors 7 and 8. Namely, if FE=(E1+E2+G)−(H1+H2+F)=0, it can be determined that there is not any trouble in focusing control.

In fact, if the objective lens 5 is too close to the optical disc 6, the beam size on the photo-detector 7 will be larger than that on the photo-detector 8 (FE<0). On the other hand, if the objective lens 5 is too far away from the optical disc 6, the beam size on the photo-detector 7 will be smaller than that on the photo-detector 8 (FE>0). As a result, a focus error signal having an S-shape shown as a graph of FIG. 13 is obtained At this moment, a focusing coil is energized so as to be excited to perform desired focusing operation, thereby rendering a detected light quantity on the photo-detector 7 to be equal to a detected light quantity on the photo-detector 8.

However, as illustrated in FIG. 11, a diffracted beam from the diffraction grating 4 is divided into two beams on both sides of the laser diode 1. Accordingly, two photo-detectors 7 and 8 are needed to receive the two diffracted beams. Further, if merely one photo-detector is allowed to be provided in the optical pickup, such a single photo-detector has to be made considerably large in order to fully receive the two diffracted beams. As a result, it is difficult for the photo-detector to be made compact in size.

In order to make it possible to use a single compact photo-detector, there has been also suggested another optical pickup employing hologram, such as that shown in FIG. 14. Referring to FIG. 14, a diffraction grating 4' is divided into two sections each having a single pattern of diffraction grating. The dividing line for dividing the diffraction grating 4' into two sections is parallel with numerical information tracks formed on an optical disc.

The beam shape and size formed on the detecting surface of a photo-detector 7' is shown in FIG. 15. A focusing error signal FE at the moment of FIG. 15 is zero, i.e., FE=(E1+E2+G)−(H1+H2+F)=0.

However, the optical pickup shown in FIG. 14 has a following problem. Namely, the diffraction pattern shown on the photo-detector 7' will be affected by information pits of an optical disc, and such a diffraction pattern will sometimes be like that shown in FIG. 16. Referring to FIG. 16, a dark area appears in the beam spot on the photo-detector 7. This dark area occurs due to diffracted lights caused by tracks adjacent left and right to an information track being irradiated by a laser beam. At this moment, reduced light quantities in the above areas H1, H2 and G will not necessarily comply with a relationship (reduced light quantity in area H1)+(reduced light quantity in area H2)=(reduced light quantity in area G), resulting in a trouble that the focus error FE will deviate from zero. In other words, the focus error detection is difficult to be performed correctly if there are some diffracted lights caused by tracks adjacent left and right to an information track being irradiated by a laser beam.

In order to eliminate the problem existing in the optical pickup shown in FIG. 14, there has been suggested a further optical pickup employing hologram as shown in FIG. 17. The optical pickup shown in FIG. 17 is substantially the same as the optical pickup shown in FIG. 14, except that a dividing line for dividing the diffraction grating 4" into two sections is orthogonal to numerical information tracks formed on an optical disc.

The beam shape and size formed on the detecting surface of a photo-detector 7" is shown in FIG. 18. A focusing error signal FE at the moment of FIG. 18 is zero, i.e., FE=(E+G)−(H+F)=0.

Although as shown in FIG. 19, dark areas appear in the beam spots on the photo-detector 7", it has been found that the focus error FE will not deviate from zero so long as the objective lens does not deviate from its correct position. However, in the event that the objective lens is deviated from its correct position due to some irresistible reasons, the positions of beam spots on the photo-detector 7" will be like those as shown in FIG. 20. It has been found that when the positions of beam spots are as shown in FIG. 20, the focus error FE will deviate from zero, hence making it difficult to correctly detect a focus error. In other words, although it is possible to eliminate troubles due to diffracted lights caused by tracks adjacent left and right to an information track being irradiated by a laser beam, it is still difficult to eliminate troubles caused by irresistible deviation of the objective lens.

SUMMARY OF THE INVENTION

It is an object of the present invention to provide an improved optical pickup permitting the use of a compact photo-detector, capable of prohibiting any possible undesired influences on focus error detection, so as to solve the above-mentioned problems peculiar to the above-mentioned prior arts.

According to the present invention, there is provided an optical pickup which comprises a light source, an objective lens for converging a beam from the light source onto an optical disc, a diffraction grating for passing a beam returning from the optical disc, a photo-detector for receiving returning beams passing through the diffraction grating. The diffraction grating is divided into two areas, each area including alternatively arranged first diffraction grating pattern and second diffraction grating pattern.

In detail, a diffracted light from the first diffraction grating pattern and a diffracted light from the second diffraction grating pattern, which have been diffracted in almost the same direction, are received by the photo-detector.

In one aspect of the present invention, the first diffraction grating pattern and the second diffraction grating pattern in the central part of the diffraction grating have a narrower width than diffraction grating patterns in other parts of the diffraction grating.

In another aspect of the present invention, the sectional shapes of the first diffraction grating pattern and the second diffraction grating pattern are all made into saw-tooth waveform.

In a further aspect of the present invention, the first diffraction grating pattern and the second diffraction grating pattern are capable of converging beam at least in one direction.

In a still further aspect of the present invention, the first diffraction grating pattern and the second diffraction grating pattern are divided from each other by generally straight lines orthogonal to information tracks of an optical disc, the first diffraction grating pattern and the second diffraction grating pattern are alternatively arranged.

The above objects and features of the present invention will become more understood from the following description with reference to the accompanying drawings.

DETAILED DESCRIPTION OF THE PREFERRED EMBODIMENTS

Figure 1:
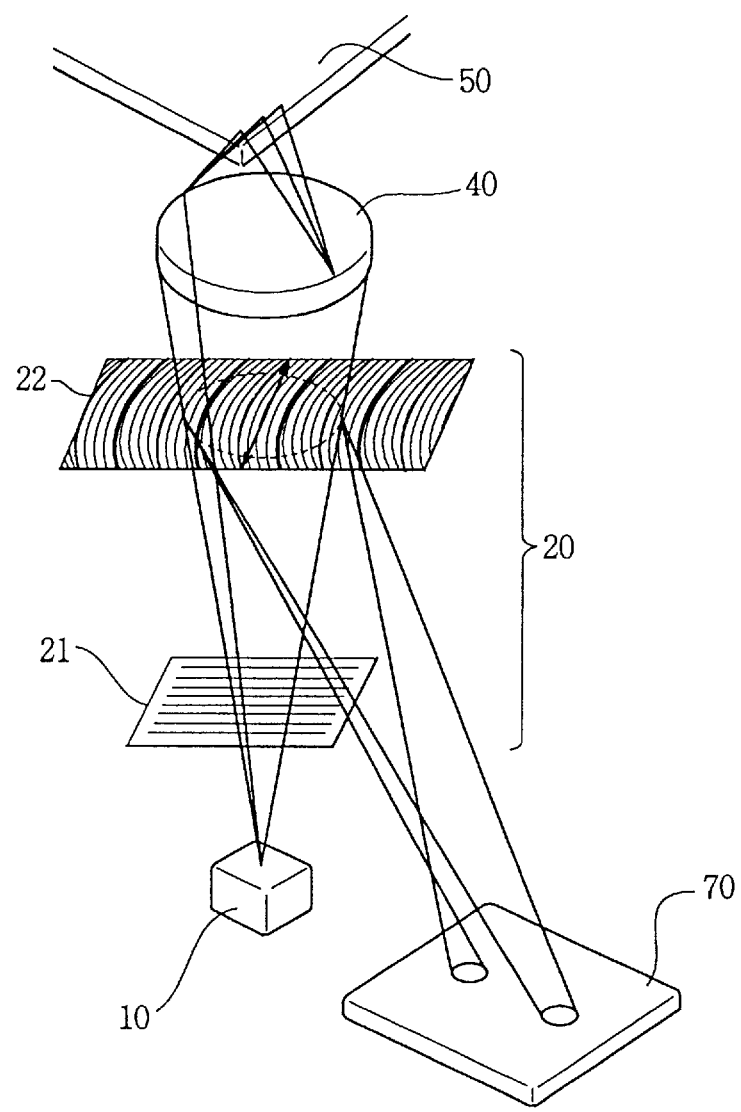
FIG. 1 is an explanatory perspective view showing the structure and operation principle of an optical pickup according to the present invention.

Referring to FIG. 1, in the optical pickup employing hologram according to the present invention, a laser beam being irradiated from a laser diode 10 is passed through a diffraction grating 21 provided on the lower side of a hologram optical unit 20, so as to be divided into three beams including ± first order beams and a zero order beam. The three beams are passed through a diffraction grating 22 provided on the upper side of the hologram optical unit 20, and are further passed through an objective lens 40 to be converged onto an optical disc 50.

A beam returning from the optical disc 50 is also passed through the objective lens 50 and then the diffraction grating 22, so that ± first order beams are separated and diffracted into single direction. Then, the ± first order beams diffracted into single direction are directed on to the photo-detector 70.

Figure 2:
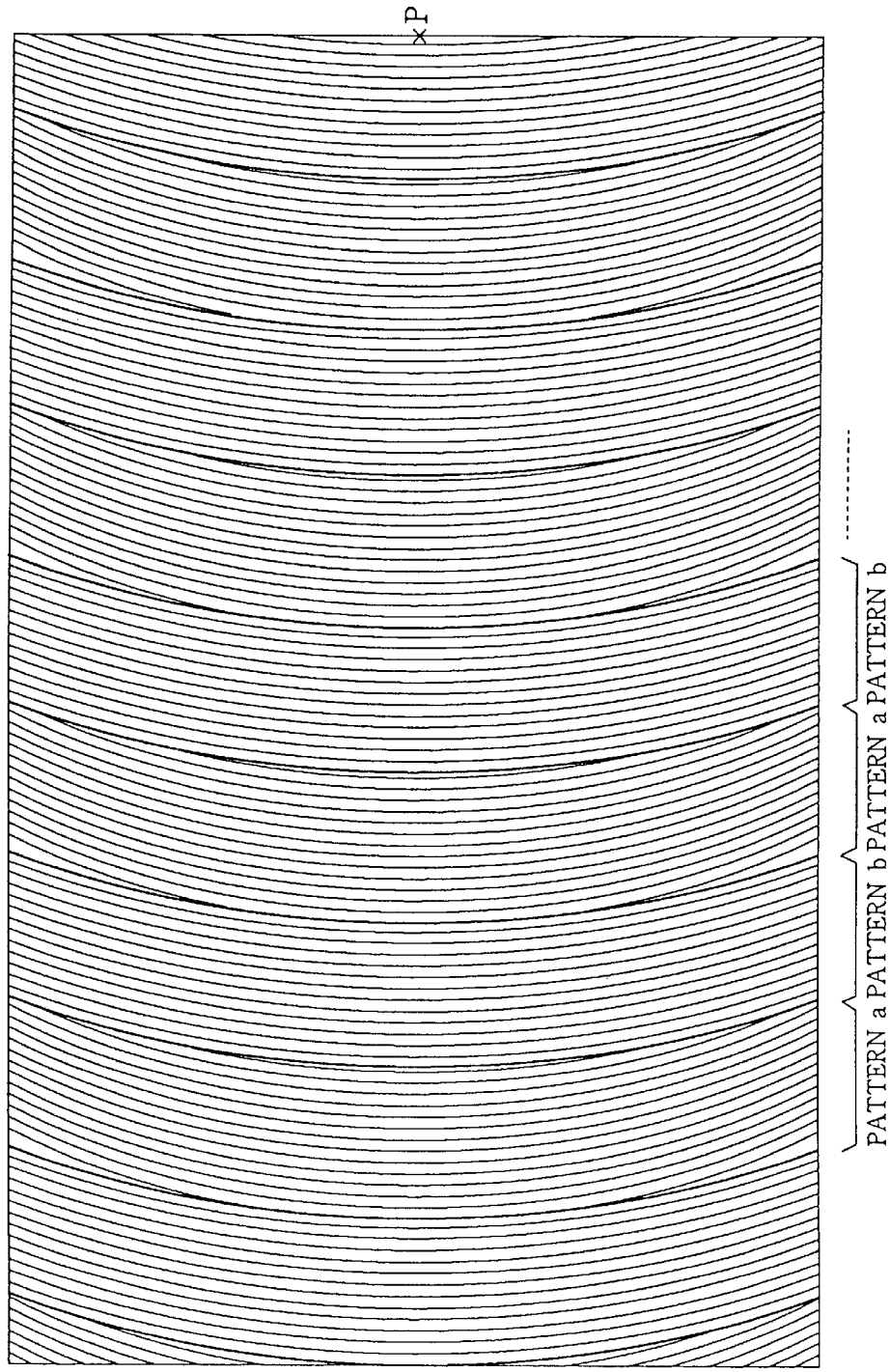
FIG. 2 is an explanatory perspective view showing part of a diffraction grating used in the optical pickup of FIG. 1.
Figure 3:
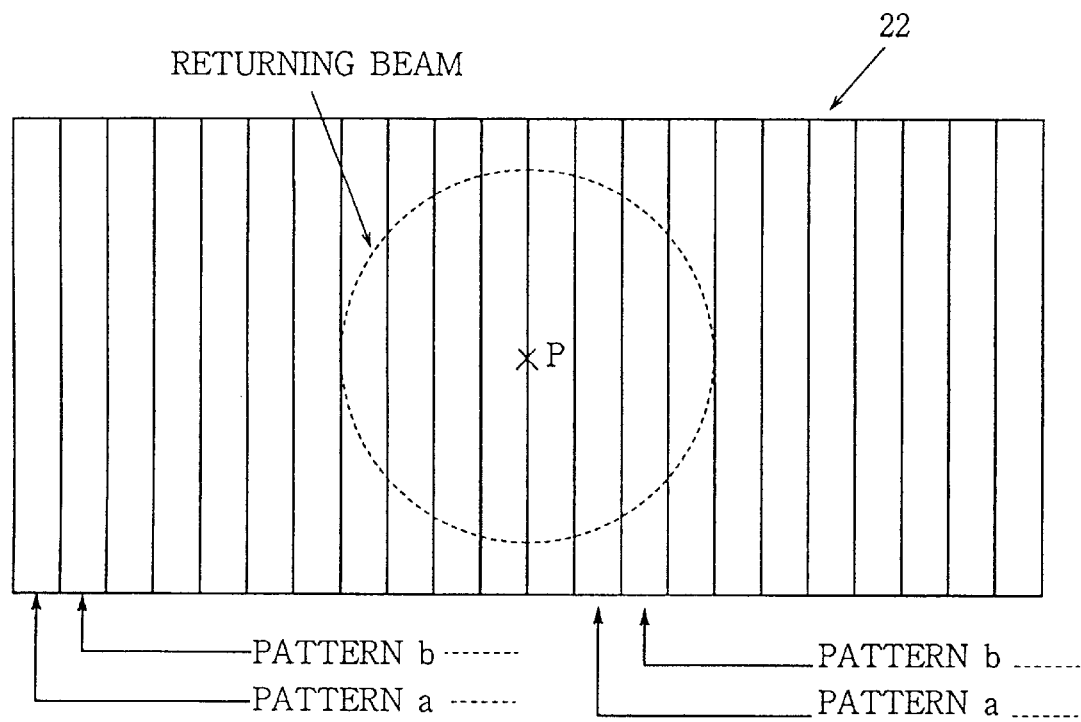
FIG. 3 is an explanatory view showing the entire structure of the diffraction grating used in the optical pickup of FIG. 1.

The diffraction grating 22 is divided into two sections by a dividing line which is almost parallel with information tracks on an optical disc. Referring to FIG. 2 which shows one section (one half) of the diffraction grating 22, each section of the diffraction grating 22 involves first diffraction grating pattern a and second diffraction grating pattern b, both these patterns are arranged alternatively so as to form each diffraction grating section. Nevertheless, if the diffraction grating 22 is diagrammatically indicated as a whole, it is possible to obtain a result as shown in FIG. 3. In fact, FIG. 2 only indicates the left half of the diffraction grating 22 of FIG. 3.

Figure 4:
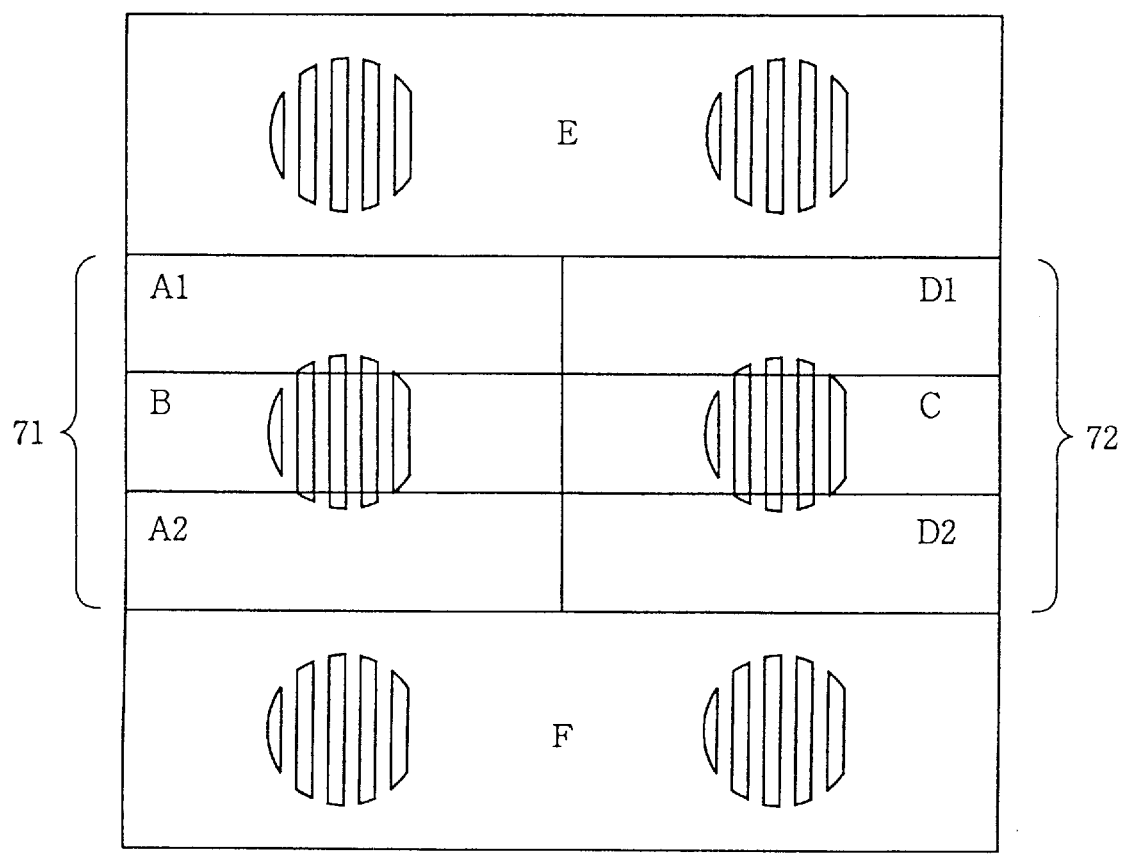
FIG. 4 is an explanatory view showing a condition where beams diffracted by the diffraction grating of FIG. 2 are being received on a photo-detector.

FIG. 4 illustrates the light receiving surface of the photo-detector 70 which receives returning beams diffracted by the above first diffraction grating pattern a and second diffraction grating pattern b. In detail, the photo-detector 70 has light receiving surfaces 71 and 72, both of which receive returning beams diffracted by the above first diffraction grating pattern a and second diffraction grating pattern b. The light receiving surface 71 is further divided into sections A1, B, A2 by dividing lines parallel with information tracks of an optical disc. Similarly, the light receiving surface 72 is further divided into sections (D1, C, D2) by dividing lines parallel with information tracks of an optical disc. However, sections E and F are light receiving surfaces for receiving returning beams diffracted by the diffraction grating 21.

Here, a beam passing through the first diffraction grating pattern a will converge in front of the photo-detector 70, whereas a beam passing through the second diffraction grating pattern b will converge behind the photo-detector 70. Accordingly, a focus error signal FE may be detected in accordance with the following relationship reflecting beam sizes on the photo-detectors 71 and 72. Namely, if EF=(A1+A2+C)−(D1+D2+B)=0, it can be determined that there is not any trouble in focusing control.

In addition, tracking error signal may be detected with the use of three-beam method. Namely, if TE=E−F=0, it can be determined that there is not any trouble in tracking control.

Further, RF (radio frequency) signal may be obtained in accordance with such a relationship as RF=A1+B+A2+D1+C+D2.

With the use of the above constitution, since the light receiving surface of the photo-detector 70 is divided into a plurality of sections by dividing lines parallel to information tracks on an optical disc, it becomes possible to prohibit some undesired influence (caused due to diffraction pattern of information pits of an optical disc) on the focus detection which is performed on the light receiving surface of the photo-detector 70. Further, even if there is an deviation in the position of an objective lens, since positions of several beam spots on the photo-detector 70 will move symmetrically with respect to all directions, it is possible to inhibit some undesired influences caused by the deviation of the objective lens.

It has been found that focus error may be detected in accordance with a relationship reflecting beam sizes in the vertical direction in FIG. 4, whilst beam sizes in the horizontal direction in FIG. 4 do not have any effect on the focus error detection. Therefore, if a cylindrical objective lens is employed, its converging effect together with the effects of the above first and second diffraction grating patterns, will make it possible that the beam sizes in the horizontal direction on the photo-detector 70 may be made small, thereby permitting the use of a more compact photo-detector.

Further, since each of the first and second sections on the diffraction grating 22 involves alternatively arranged first diffraction grating pattern a and second diffraction grating pattern b, the laser beams passing through the diffraction grating 22 are diffracted by alternatively arranged first diffraction grating pattern a and second diffraction grating pattern b. The diffracted beams from the diffraction grating 22 are perpendicular to dividing lines which divides the diffraction grating into two sections.

If the direction of a dividing line is perpendicular to information tracks on an optical disc, the diffracted beams will have their spots (in zebra line pattern) arranged with one above the other in vertical direction in FIG. 4. This time, in order to prevent any possible cross-talk of signals between areas B, A2, D1, C, D2 and E, F, the photo-detector will have to be enlarged in the vertical direction in FIG. 4. This, however, is not preferable because the size of the photo-detector will have to be made larger.

On the other hand, if the direction of a dividing line is parallel to information tracks on an optical disc, the diffracted beams will have their spots (in zebra line pattern) arranged side-by-side in the horizontal direction as shown in FIG. 4. At this moment, since there is not any undesired influence to error detection, it is preferred that the direction of the dividing line be parallel to information tracks on an optical disc.

Figure 5:
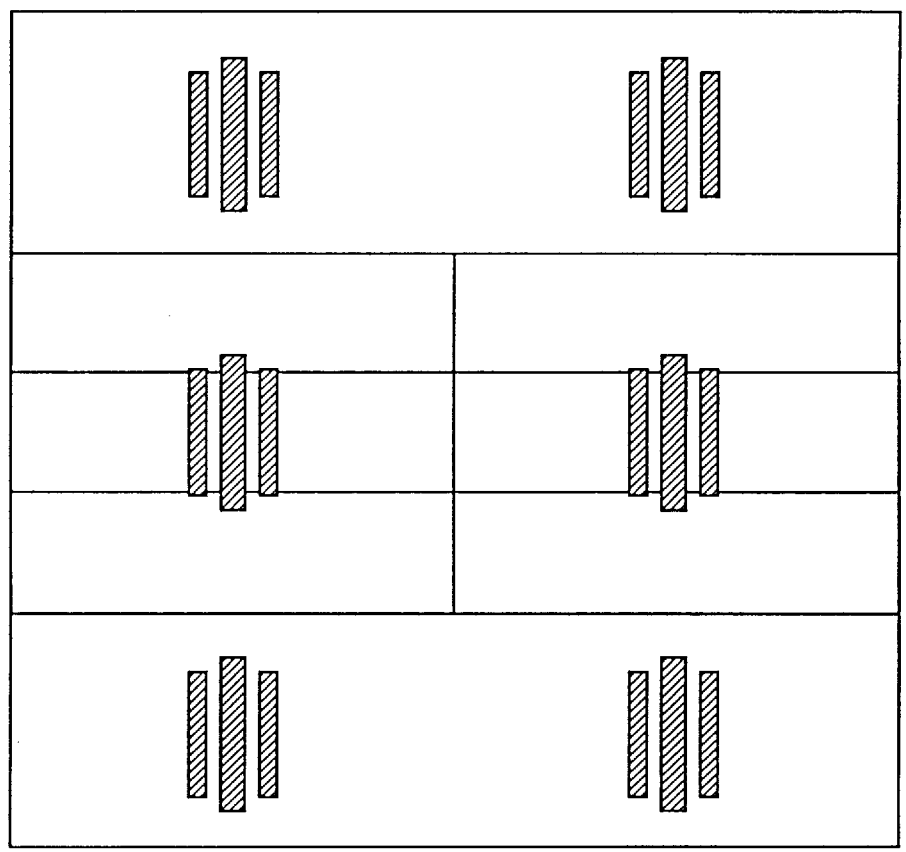
FIG. 5 is an explanatory view showing shapes of several beams on a photo-detector.

The beam shapes on the photo-detector having the above-described constitution is shown in FIG. 5.

Figure 6:
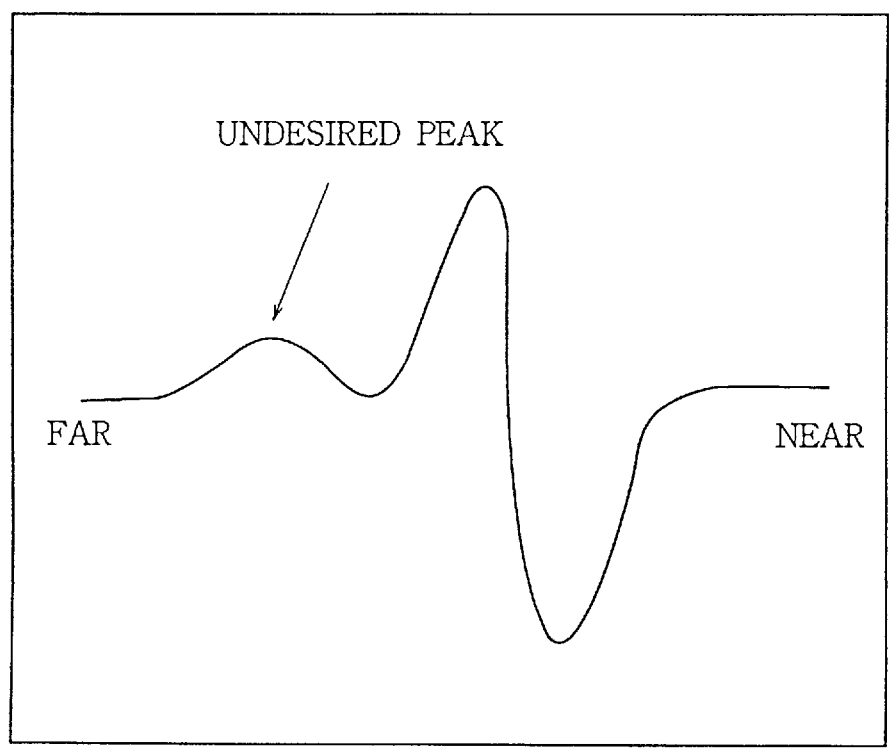
FIG. 6 is a graph showing a focus error signal.
Figure 7:
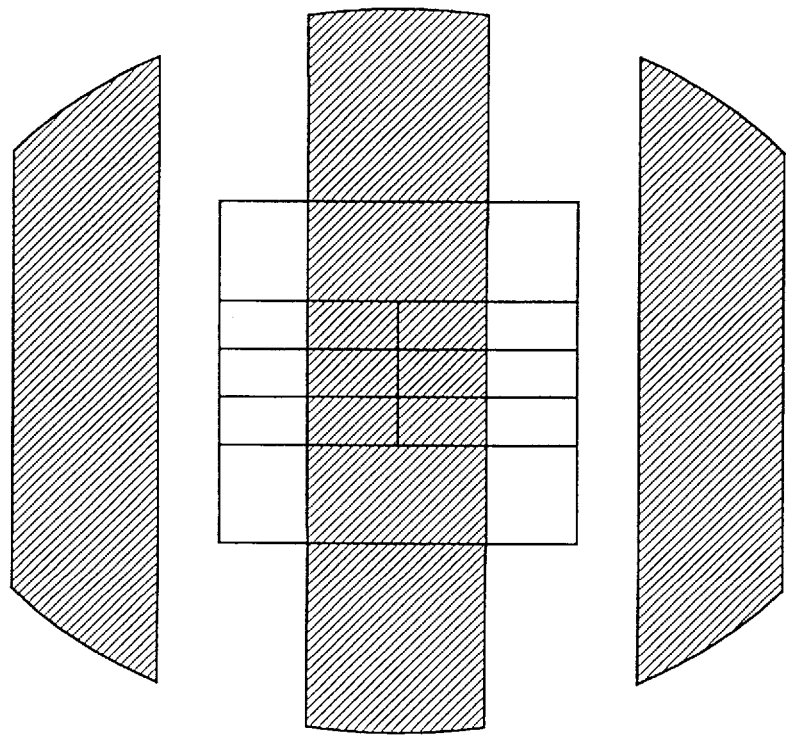
FIG. 7 is an explanatory view showing a shape of a beam spot on a photo-detector.

When the widths of the first diffraction grating pattern and the second diffraction grating pattern are large, beam diffraction angle during the process of diffraction will be small, thus it is allowed to reduce the size of the photo-detector in the horizontal direction in FIG. 4, thereby permitting the photo-detector to be made more compact. However, this will cause an undesired peak in a graph showing focus error signal as shown in FIG. 6. In addition, this undesired peak as shown in FIG. 6 will also occur when the objective lens is too far away from the recording surface of an optical disc. Namely, when the objective lens is too far away from the recording surface of an optical disc, the diameter of returning beam passing through the diffraction grating 22 will become small, producing a result that is the same as if the widths of the first diffraction grating pattern and the second diffraction grating pattern have become large. FIG. 7 indicates a beam spot on the photo-detector when the above undesired peak shown in FIG. 6 appears. In FIG. 7, dark areas represent areas of the beam spot on the light receiving surface of the photo-detector. As is understood in FIG. 7, when a beam spot on the photo-detector become large, a shape reflecting the first diffraction grating pattern and a shape reflecting the second diffraction grating pattern will be indicated as such on the photo-detector. As a result, an optical axis of the returning beam will deviate from its correct position (center of the diffraction grating), hence focus error FE will not be zero (i.e., plus or minus).

Figure 8:
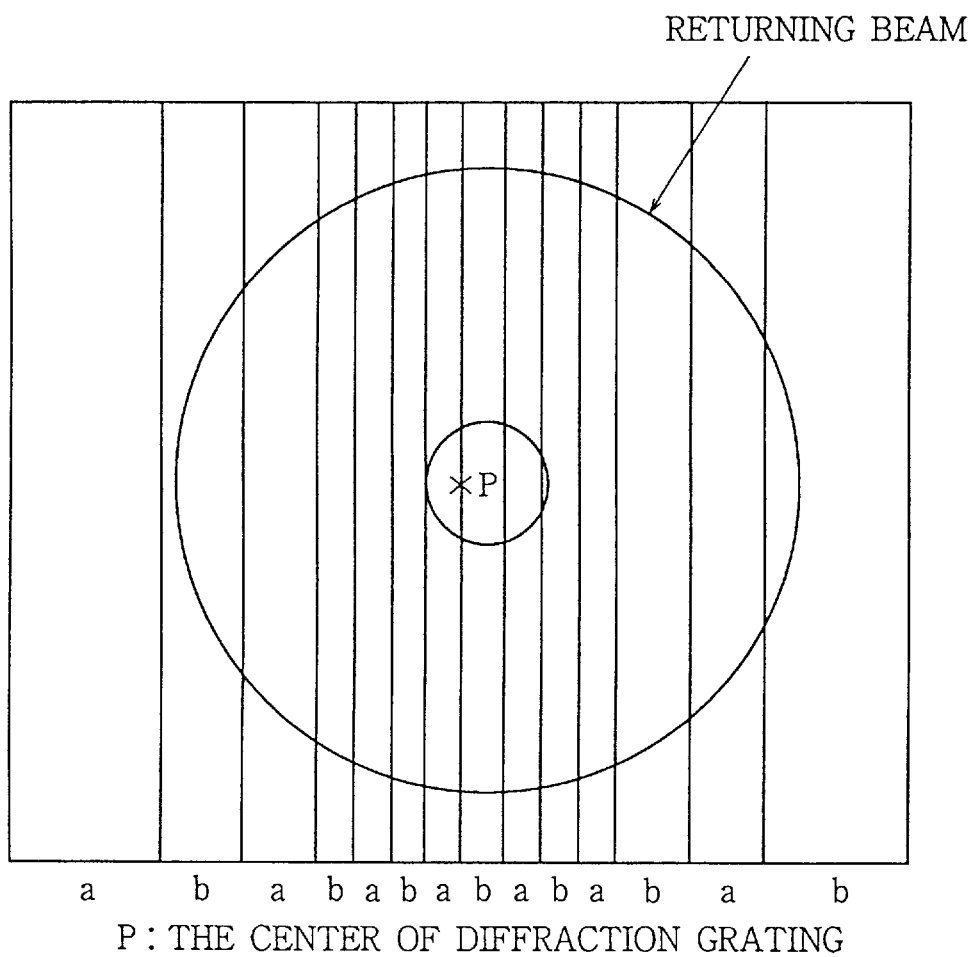
FIG. 8 is an explanatory view showing the entire structure of another diffraction grating according to the present invention.
Figure 9:
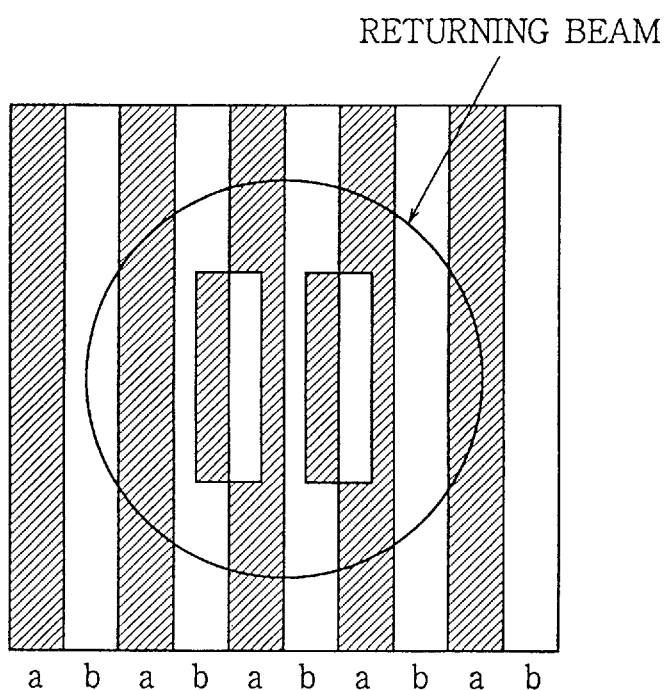
FIG. 9 is an explanatory view showing the diffraction grating of FIG. 8 when in different condition.

In order to avoid the above problem, it has once been suggested that the widths of the first diffraction grating pattern and the second diffraction grating pattern are made small. But, if the first diffraction grating pattern and the second diffraction grating patter are made small in their widths, the beam diffraction angle will become large when in focusing control, hence requiring a large photo-detector. In view of the fact that the above undesired peak in the graph of focus error signal appears only when the diameter of returning beam passing through the diffraction grating is small, we found that merely the widths of the first diffraction grating pattern and the second diffraction grating pattern on the central portion of the diffraction grating 22 are necessary to be made small, as shown in FIGS. 8 and 9. In this way, it is possible to eliminate the above undesired peak in the graph of focus error signal, without having to use a large photo-detector.

Figure 10:
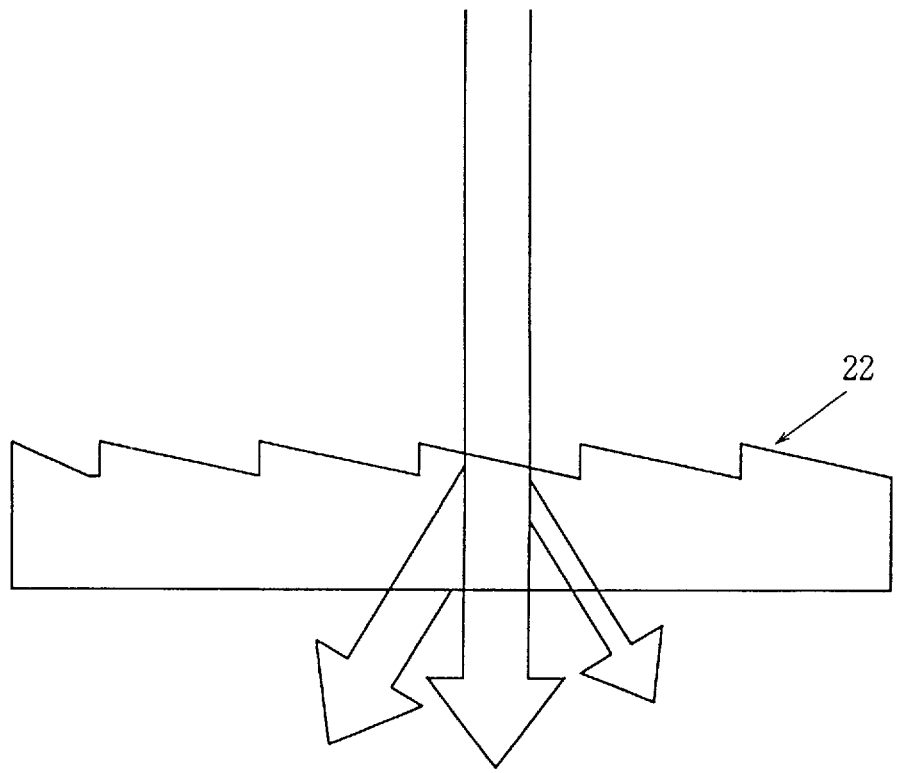
FIG. 10 is a cross sectional view showing sectional shapes of a first and a second patterns of a further diffraction grating according to the present invention.
Figure 11:
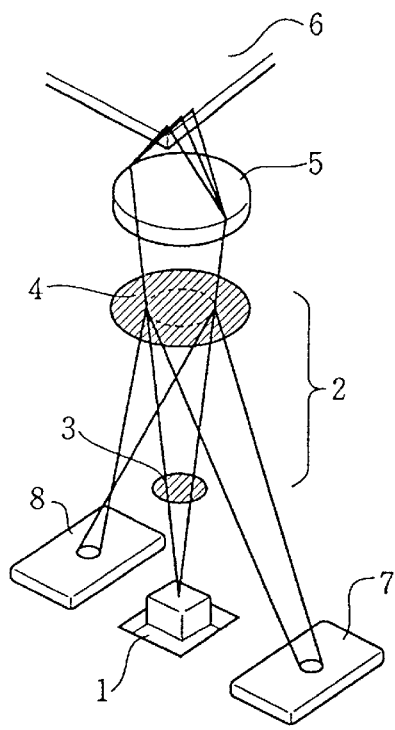
FIG. 11 is an explanatory perspective view showing the structure and operation principle of a conventional optical pickup.
Figure 12:
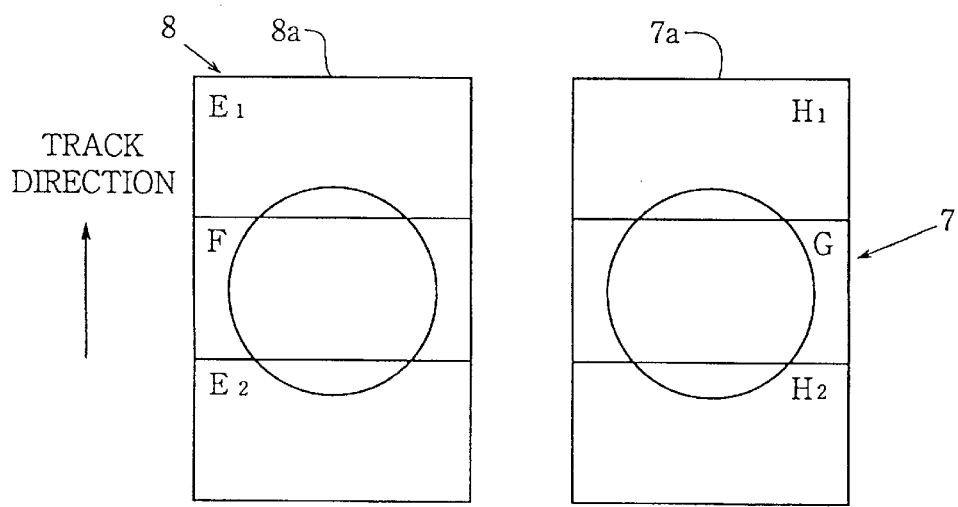
FIG. 12 is an explanatory view showing two photo-detectors used in the conventional optical pickup of FIG. 11.
Figure 13:
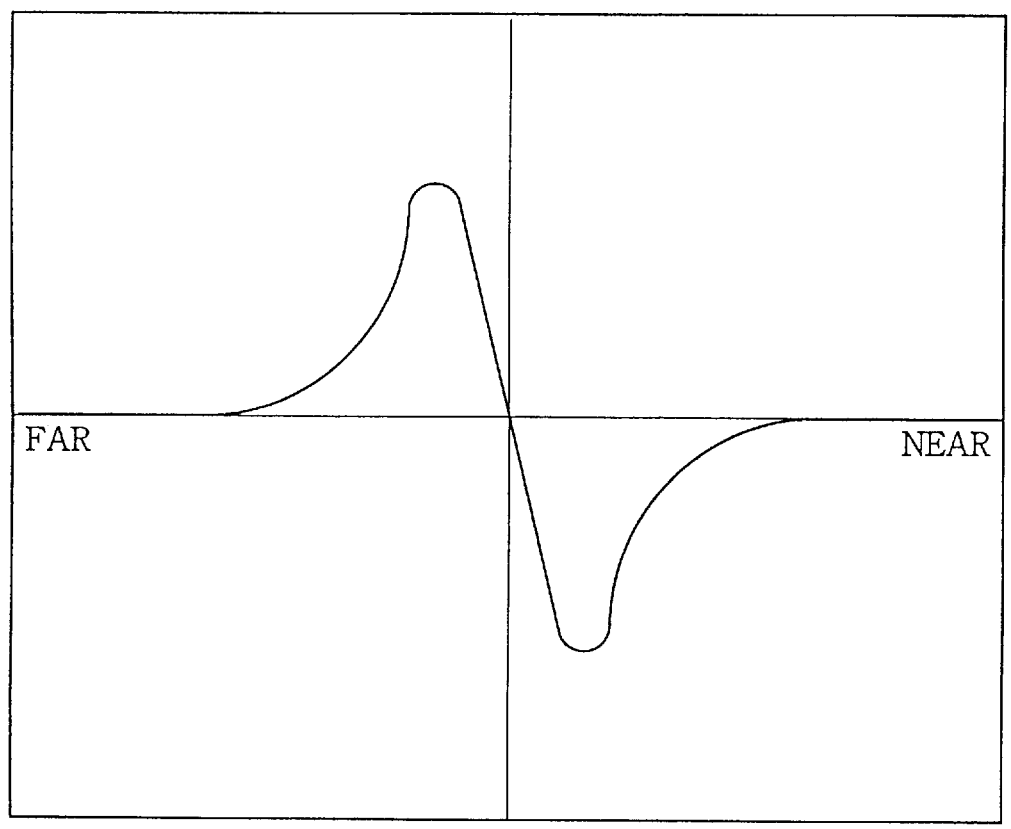
FIG. 13 is a graph showing a focus error signal.
Figure 14:
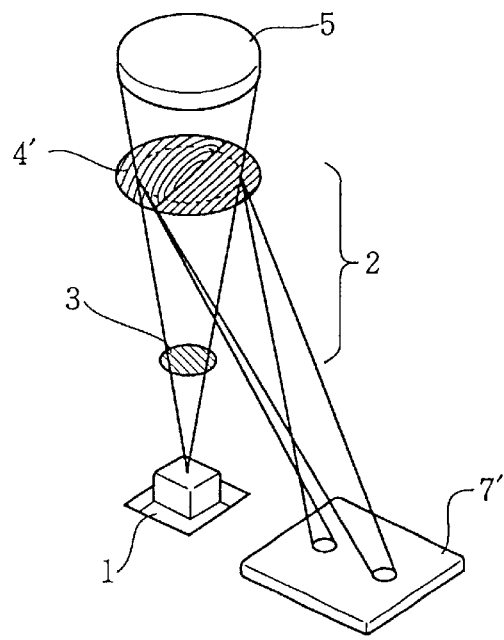
FIG. 14 is an explanatory perspective view showing the structure and operation principle of another conventional optical pickup.
Figure 15:
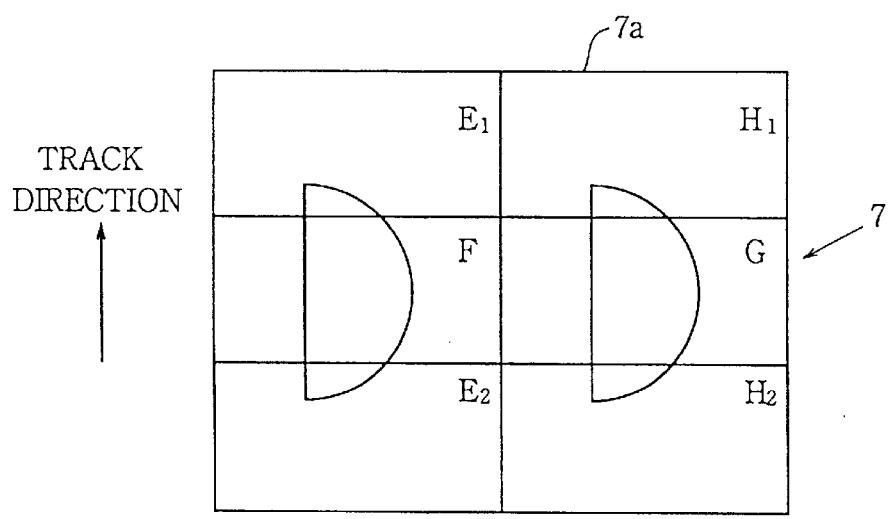
FIG. 15 is an explanatory view showing a beam condition on a photo-detector used in the conventional optical pickup of FIG. 14.
Figure 16:
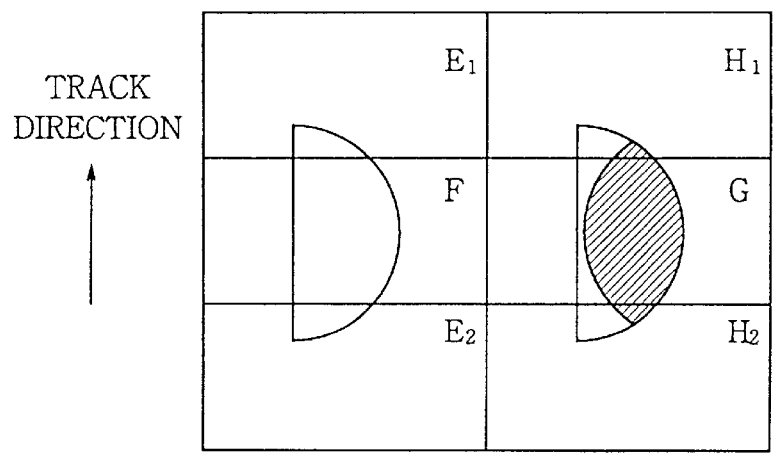
FIG. 16 is an explanatory view showing another beam condition on a photo-detector used in the conventional optical pickup of FIG. 14.
Figure 17:
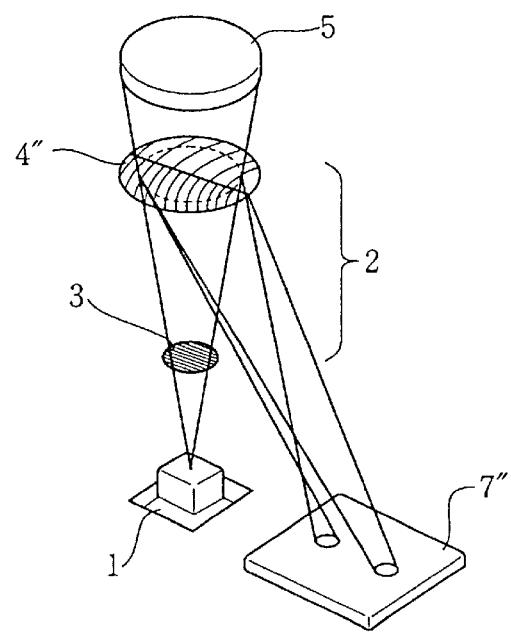
FIG. 17 is an explanatory perspective view showing the structure and operation principle of a further conventional optical pickup.
Figure 18:
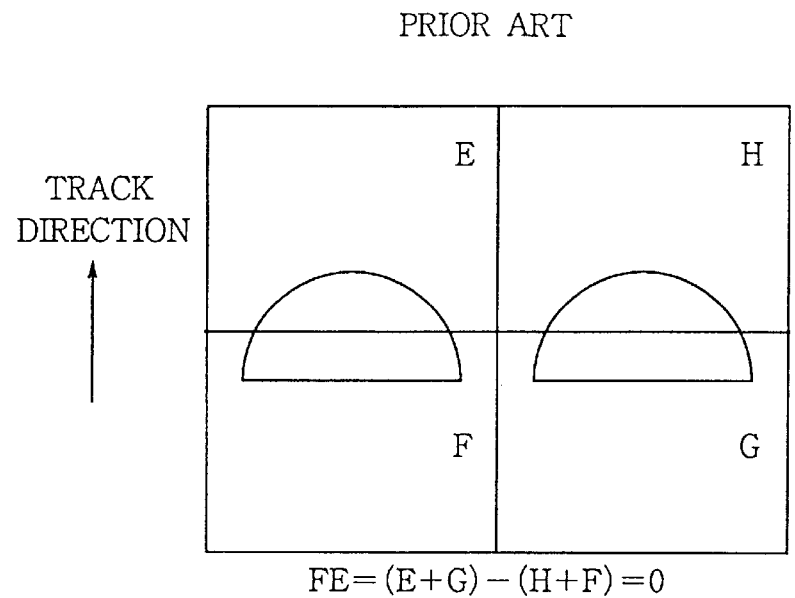
FIG. 18 is an explanatory view showing a beam condition on a photo-detector used in the conventional optical pickup of FIG. 17.
Figure 19:
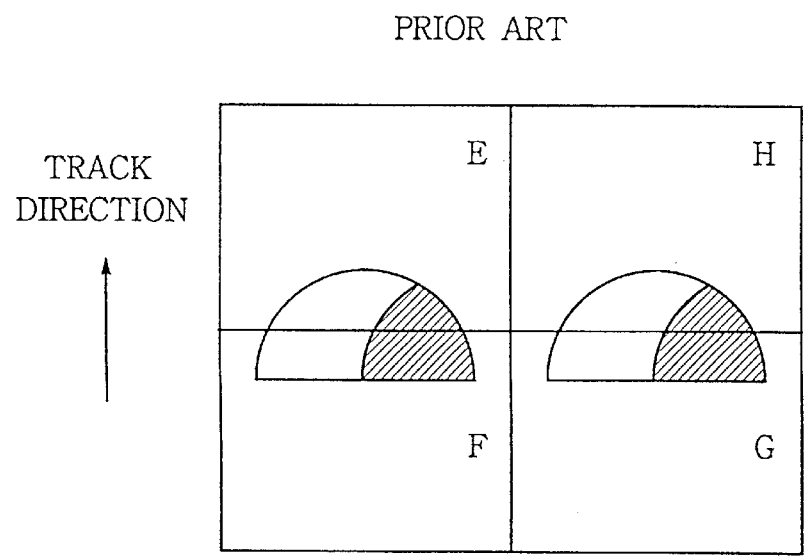
FIG. 19 is an explanatory view showing another beam condition on a photo-detector used in the conventional optical pickup of FIG. 17.
Figure 20:
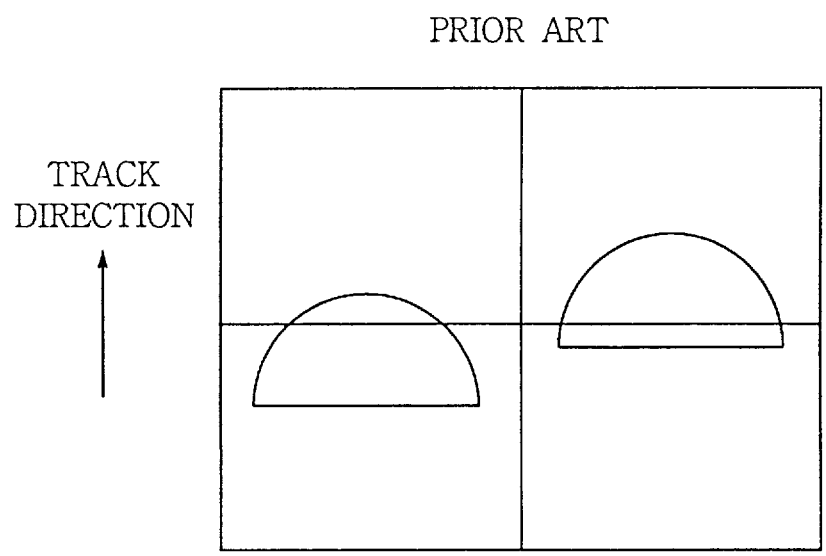
FIG. 20 is an explanatory view showing a further beam condition on a photo-detector used in the conventional optical pickup of FIG. 17, when the objective lens of the pickup is deviated from its correct position.

FIG. 10 is an explanatory view indicating another diffraction grating having a modified diffraction grating pattern. As shown in FIG. 10, the sectional shapes of the first diffraction grating pattern and the second diffraction grating pattern are all made into saw-tooth waveform. In this manner, the returning beam from the optical disc 50 are diffracted by the first diffraction grating pattern and the second diffraction grating pattern of the diffraction grating 22, thereby increasing the diffracted amount of the ± first order lights of the returning beam.

In this way, since the quantity of diffracted light irradiating on the photo-detector 70 have been increased, the focus error FE may be detected more correctly and exactly.

As is understood from the above description, with the use of the present invention, since the first diffraction grating pattern and the second diffraction grating pattern are arranged to uniformly act on the returning beam from an optical disc, it has become possible to prohibit undesired influence (on focus error detection) caused due to asymmetry of light receiving pattern of a photo-detector.

Further, since a diffracted beam from the first diffraction grating pattern and a diffracted beam from the second diffraction grating pattern may be received at mutually closed positions on a single photo-detector, the photo-detector may be made more compact.

Moreover, since merely the widths of the first diffraction grating pattern and the second diffraction grating pattern on the central port of a diffraction grating are necessary to be made narrow, the focus error FE will be kept at zero even if the optical axis of a returning beam passing through the diffraction grating is deviated from the center of the diffraction grating, without having to use a large photo-detector.

Finally, since the sectional shapes of the first diffraction grating pattern and the second diffraction grating pattern are all made into saw-tooth waveform, the diffracted amount of the ± first order lights of the returning beam can be increased. In this way, the quantity of diffracted light irradiating on the photo-detector is increased, thereby ensuring a more correct and exact detection of the focus error FE.

While the presently preferred embodiments of the this invention have been shown and described above, it is to be understood that these disclosures are for the purpose of illustration and that various changes and modifications may be made without departing from the scope of the invention as set 20 forth in the appended claims.

What is claimed is:

1. An optical pickup comprising:

a light source;

an objective lens for converging a beam from the light source onto an optical disc;

a diffraction grating for passing a beam returning from the optical disc;

a photo-detector for receiving returning beams passing through the diffraction grating;

wherein the diffraction grating is divided into two areas, each area including alternatively arranged first diffraction grating pattern and second diffraction grating pattern.

2. An optical pickup according to claim 1, wherein the first diffraction grating pattern is different from the second diffraction grating pattern.

3. An optical pickup comprising:

a light source;

an objective lens for converging a beam from the light source onto an optical disc;

a diffraction grating for passing a beam returning from the optical disc, the diffraction grating being divided into two areas, each area including alternatively arranged first diffraction grating pattern and second diffraction grating pattern;

a photo-detector for receiving returning beams passing through the diffraction grating;

wherein the diffracted light from the first diffraction grating pattern and the diffracted light from the second diffraction grating pattern, which have been diffracted in almost the same direction, are received by the photo-detector.

4. An optical pickup according to claim 3, wherein the first diffraction grating pattern are different from the second diffraction grating pattern.

5. An optical pickup according to claim 1 or 3, wherein the first diffraction grating pattern and the second diffraction grating pattern in the central part of the diffraction grating have a narrower width than diffraction grating patterns in other parts of the diffraction grating.

6. An optical pickup according to claim 1 or 3, wherein the sectional shapes of the first diffraction grating pattern and the second diffraction grating pattern are all made into saw-tooth waveform.

7. An optical pickup according to claim 1 or 3, wherein the first diffraction grating pattern and the second diffraction grating pattern are capable of converging beam at least in one direction.

8. An optical pickup according to claim 1 or 3, wherein the first diffraction grating pattern and the second diffraction grating pattern are divided from each other by generally straight lines orthogonal to information tracks of an optical disc, the first diffraction grating pattern and the second diffraction grating pattern are alternatively arranged.

* * * * *